(12) United States Patent
Nakajima et al.

(10) Patent No.: US 8,111,964 B2
(45) Date of Patent: Feb. 7, 2012

(54) OPTICAL FIBER

(75) Inventors: Yasuo Nakajima, Chiyoda-ku (JP);
Hiroki Tanaka, Chiyoda-ku (JP);
Yoshihiro Arashitani, Chiyoda-ku (JP);
Kouji Mochizuki, Chiyoda-ku (JP);
Mitsunori Okada, Chiyoda-ku (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 1012 days.

(21) Appl. No.: 11/794,253

(22) PCT Filed: Aug. 10, 2006

(86) PCT No.: PCT/JP2006/316115
§ 371 (c)(1),
(2), (4) Date: Jun. 27, 2007

(87) PCT Pub. No.: WO2008/018155
PCT Pub. Date: Feb. 14, 2008

(65) Prior Publication Data
US 2010/0046900 A1  Feb. 25, 2010

(51) Int. Cl.
*G02B 6/02* (2006.01)
(52) U.S. Cl. ........................................ 385/128
(58) Field of Classification Search ............ 385/128
See application file for complete search history.

(56) References Cited

U.S. PATENT DOCUMENTS

| 6,171,698 B1 | 1/2001 | Khudyakov et al. |
| 6,768,853 B2 * | 7/2004 | Neveux, Jr. .................. 385/128 |
| 7,085,465 B2 | 8/2006 | Ono et al. |
| 7,209,614 B2 | 4/2007 | Tanaka et al. |
| 2005/0031283 A1 | 2/2005 | Fabian et al. |

FOREIGN PATENT DOCUMENTS

| EP | 1 077 205 A2 | 2/2001 |
| JP | 9-251121 | 9/1997 |
| JP | 2001-114535 | 4/2001 |

(Continued)

OTHER PUBLICATIONS

U.S. Appl. No. 12/003,435, filed Dec. 26, 2007, Nakajima, et al.
U.S. Appl. No. 12/235,123, filed Sep. 22, 2008, Nakajima, et al.
U.S. Appl. No. 12/626,814, filed Nov. 27, 2009, Nakajima, et al.
U.S. Appl. No. 12/770,807, filed Apr. 30, 2010, Nakajima, et al.
U.S. Appl. No. 13/101,377, filed May 5, 2011, Nakajima, et al.

*Primary Examiner* — Jerry Rahll
(74) *Attorney, Agent, or Firm* — Oblon, Spivak, McClelland, Maier & Neustadt, L.L.P.

(57) ABSTRACT

The present invention provides an optical fiber in which composites constructing its coating are not complicated, so, there is also little constraint in view of production, and, moreover, delamination between a glass optical fiber and a primary layer, and a bubble in the primary layer hardly arise. The optical fiber of the present invention is an optical fiber which has a glass optical fiber which has a core 1, which passes an optical signal, in a center portion, and a cladding 2 surrounding this, a primary protective layer 3 made to coat the glass optical fiber, a secondary protective layer 4 applied on this primary protective layer 3, and a third protective layer 5 applied to an outer periphery of this secondary protective layer 4, wherein glass transition temperature of the primary protective layer 3 is made to be higher than −20° C. and 10° C. or lower, glass transition temperature of the secondary protective layer 4 is made to be −10° C. or less, and the glass transition temperature of the primary protective layer 3 is set higher than that of the secondary protective layer 4.

2 Claims, 3 Drawing Sheets

FOREIGN PATENT DOCUMENTS

| | | |
|---|---|---|
| JP | 2001-130929 | 5/2001 |
| JP | 2006-053346 | 2/2006 |
| WO | WO 2005/010589 A1 | 2/2005 |

\* cited by examiner

OPTICAL FIBER

BACKGROUND OF INVENTION

1. Field of the Invention

The present invention relates to an optical fiber, which has a highly reliable coating layer, in an optical fiber which transmits an optical signal.

2. Related Background Art

A common conventional optical fiber has structure of a core 1, which passes an optical signal, in a center portion as illustrated in FIG. 4, a soft primary layer 13 which is made to cover a glass optical fiber which includes a quartz glass which has a cladding 2 provided outside the core 1, and a hard secondary layer 14 which is further covered on this primary layer 13.

Then, generally, an ultraviolet curing resin with 3 MPa or lower of Young's modulus is used for the above-mentioned primary layer 13, and an ultraviolet curing resin with 500 MPa or more of Young's modulus is used for the secondary layer 14, respectively.

By the way, as for a polymeric material, physical properties change a lot with bordering on glass transition temperature (hereinafter, only Tg). In particular, in an optical fiber, it is devised that transmission loss of an optical signal which transmits the optical fiber may not be influenced further by an external force by using difference between changes in physical properties because of Tg of an ultraviolet curing resin which is a coating material.

Specifically, in order to give a buffering action to the primary layer 13, a material with low Tg is used as a soft material. Thus, a material with Tg lower than operating environment temperature is selected, and in the usual case, a material with Tg lower than room temperature is used. In other words, since operating environment temperature is higher than Tg, the primary layer 13 has a function as a buffer layer by being in a flexible rubbery state at the operating environment temperature.

On the other hand, since a hard layer called the secondary layer 14 has Tg higher than operating environment temperature, the hard layer is used in a glassy state in the operating environment temperature, and hence, the hard layer acts as a hard protective layer.

When such an optical fiber is immersed in water, delamination may arise between the glass optical fiber and primary layer 13.

Of course, when a coloring layer is applied to an optical fiber illustrated in FIG. 4 or an optical fiber with the coloring layer, that is, a ribbon is constructed by arranging two or more optical fiber planarly to apply the ribbon layer to this, there is a possibility that delamination may arise between the secondary layer 14 and coloring layer, or also between the coloring layer and ribbon layer.

When such delamination arises, and particularly, when delamination arises in an interface between the glass optical fiber and primary layer 13, an uneven force acts to the glass optical fiber owing to this to generate a micro bending, and will increase transmission loss.

Then, so as not to generate the delamination between coating layers, careful examination of a material of each coating layer, and particularly, great efforts for securing sufficient adhesiveness in the interface between the glass optical fiber and primary layer 13 are made.

As an example of one aiming at making the adhesiveness of this interface between the glass optical fiber and primary layer improved, there is an invention disclosed in Japanese Patent Application Laid-Open No. 2001-114535 (patent document 1).

In the patent document 1, for the purpose of making the adhesiveness between a glass optical fiber and a primary layer improved, an optical fiber in which the primary layer is formed of a multilayer coating layer is disclosed. Specifically, an optical fiber is proposed, the optical fiber in which an elastic primary layer is formed in a plurality of layers, and the adhesiveness of the interface between the glass optical fiber and primary layer is made to be improved by heightening concentration of a photo-initiator with proceeding into inside layers.

By the way, for an ultraviolet curing resin for the primary layer 13 used for a sheath of an optical fiber, flexibility is requested strongly in order to enhance resistance on a micro bending first. In particular, with supposing a winter season when operating environment temperature becomes low temperature, it is desired to make Tg of the ultraviolet curing resin for the primary layer 13 lower than operating environment temperature of the optical fiber.

The primary layer 13 becomes good in transmission characteristics in low temperature as Tg becomes low, and as becoming flexible, the resistance on the micro bending becomes good. For that purpose, generally, a materials design is made so as to makes Tg of the primary layer 13 low in consideration of low-temperature resistance, and to make molecular weight between crosslinking points large in consideration of flexibility.

Nevertheless, since the coating becomes flexible but a crosslinked network becomes coarse when Tg of the coating material is made low and the molecular weight between cross-links is made large, there is a problem that a so-called bubble arises easily in the primary layer 13 when the optical fiber is exposed to water and moisture permeates the coating layer. Therefore, actually, although the molecular weight between the crosslinking points is adjusted by making the Young's modulus of the primary layer 13 as a guidepost in order to prevent occurrence of this bubble, materials with Tg of −20° C. or higher are used as the primary layer 13 which satisfies this in many cases.

In particular, when a bubble arises near the interface between the glass optical fiber and primary layer 13 and near the glass optical fiber, micro bending loss arises easily. Therefore, a device in view of a material for making the bubble of the primary layer 13 hard to arise has been investigated energetically.

SUMMARY OF THE INVENTION

As mentioned above, in an optical fiber, there is an issue that transmission loss increases by a micro bending when delamination arises, for example, in an interlayer between a glass optical fiber and a primary layer, or a bubble arises in a primary layer.

In order to solve this, as demand characteristics to a primary layer, it is indispensable to fulfill various demand characteristics, such as adhesiveness to glass, water resistance, and further, buffering property to a stress from the external.

Nevertheless, as for the optical fiber disclosed in the patent document 1, only the enhancement of adhesiveness between a glass optical fiber and a primary layer is fundamentally pursued, but, regarding occurrence prevention of a bubble in the primary layer, nothing is referred to.

In addition, the structure of the optical fiber disclosed in the patent document 1 cannot help becoming such very complicated construction that a primary layer is made into two or more layers in order to solve the issue of adhesiveness, and moreover, concentration must be made high for a content of a photo-initiator as a layer becomes inside the primary layer. Hence, constraint in view of production also became large.

In consideration of the above issues, the present invention aims at providing an optical fiber in which composites constructing its coating are not complicated, so, there is also little constraint in view of production, and, moreover, delamination between a glass optical fiber and a primary-layer, and a bubble in the primary layer hardly arise.

In order to achieve the above-described object, an optical fiber according to claim 1 is an optical fiber having a glass optical fiber which has a core and a cladding, a primary protective layer made to coat the glass optical fiber, a secondary protective layer applied on this primary protective layer, and a third protective layer applied to an outer periphery of the secondary protective layer, being characterized in that glass transition temperature of the primary protective layer is made to be higher than −20° C. and 10° C. or lower, glass transition temperature of the secondary protective layer is made to be −10° C. or lower, and the glass transition temperature of the primary protective layer is made to be higher than that of the secondary protective layer.

According to the optical fiber according to claim 1 which is constructed in this way, bubble occurrence in the primary protective layer in contact with the glass optical fiber becomes hard to arise by making glass transition temperature of the primary protective layer to be higher than −20° C. and 10° C. or lower, and to be higher than Tg of the secondary protective layer. Hence, it is estimated that it is hard for the delamination to arise in the interlayer between the glass optical fiber and primary protective layer.

In addition, a value of tan δ obtained from a dynamic mechanical analysis can also obtain a high value in normal temperature, that is, near operating environment temperature by making Tg of the primary protective layer higher than −20° C. and 10° C. or lower, and making Tg higher than that of the secondary protective layer. In consequence, it is guessed that the adhesiveness of the primary protective layer to the glass optical fiber becomes high also in the normal temperature.

Furthermore, flexibility is also maintainable within limits of operating environment temperature by making Tg of the secondary protective layer lower than that of the primary protective layer, and making Tg at −10° C. or lower and lower than the operating environment temperature. Therefore, the micro bending to the glass optical fiber becomes harder to arise.

It becomes hard to cause increase of transmission loss by a heat cycle by improving micro bending resistance characteristic in this way, and an optical fiber which has high performance and high reliability as a so-called transmission path can be obtained.

In brief, according to the optical fiber according to claim 1, bubble occurrence becomes hardly to arise in the primary protective layer by providing the primary protective layer with high Tg, and the delamination at the interface between the glass optical fiber and primary protective layer becomes hardly to arise. In consequence, it can be performed to make Tg of the secondary protective layer, which occupies most buffer layers, lower than a conventional optical fiber, it can be performed to enhance the micro bending resistance characteristic by the secondary protective layer by the flexibility, and it can be performed to obtain an optical fiber good also in a heat cycle.

Moreover, since its coating structure is also simple three-layer structure, and the composites which form these coating layers are not such a complicated one that concentration of a photo-initiator must be controlled in a thickness direction like the optical fiber disclosed in the patent document 1, there is also little constraint in respect of production, and its production is also easy.

In addition, an optical fiber according to claim 2 of the present invention is characterized in that a thickness of the primary protective layer is equal to or less than a thickness of the secondary protective layer in the optical fiber according to claim 1.

According to the optical fiber according to claim 2 which is constructed in this way, since the thickness of the primary protective layer which is inferior in flexibility because Tg of the primary protective layer is higher than Tg of the secondary protective layer is thinner than the thickness of the secondary protective layer, it can be performed to keep an influence on the glass optical fiber at a minimum. That is, it can be performed to minimize an adverse effect on the micro bending resistance characteristic by making Tg of the primary protective layer higher than that of the secondary protective layer in order to enhance the adhesiveness to the glass optical fiber.

In addition, an optical fiber according to claim 3 of the present invention is characterized in that a thickness of the primary protective layer is 10 μm or less in the optical fiber according to claim 2.

According to the optical fiber which is constructed in this way, it can be performed to obtain securely the operation and effect in the optical fiber according to claim 2 which are mentioned above because the thickness of the primary protective layer is made 10 μm or less which is extremely thin.

As described above, the present invention can provide an optical fiber in which composites constructing its coating are not complicated, so, there is also little constraint in view of production, and, moreover, delamination between a glass optical fiber and a primary layer, and a bubble in the primary layer hardly arise.

DESCRIPTION OF THE PREFERRED EMBODIMENTS

An optical fiber of the present invention will be described below in detail using drawings.

Figure 1:
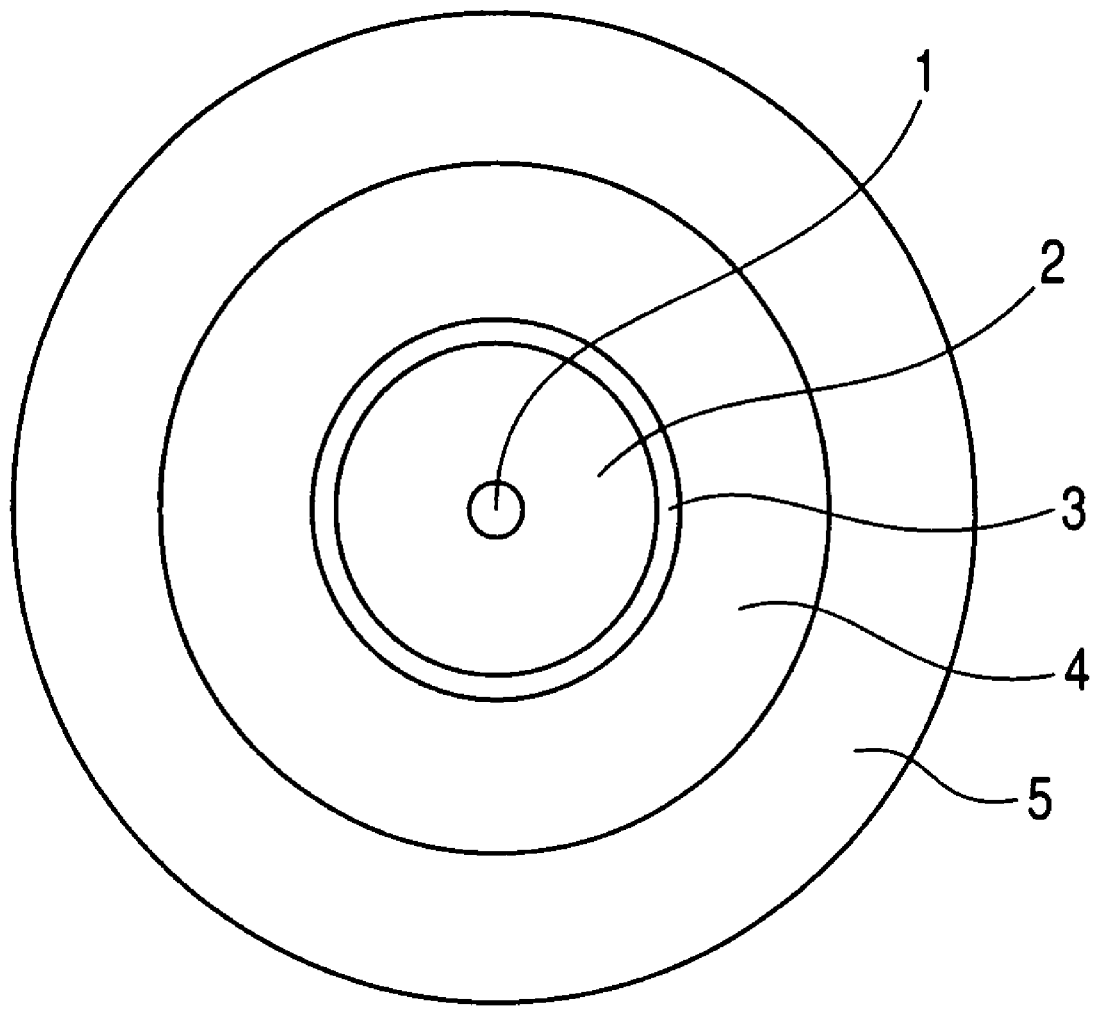
FIG. 1 is a cross-sectional schematic diagram showing one example of an optical fiber of the present invention.

FIG. 1 is a cross-sectional schematic diagram showing one example of an optical fiber of the present invention. As illustrated in FIG. 1, the optical fiber of the present invention has a glass optical fiber which has a core 1, passing an optical signal, in a center portion and a cladding 2 in its outer periphery, a primary protective layer 3 made to coat the glass optical fiber, a secondary protective layer 4 applied on this primary protective layer 3, a third protective layer 5 applied to an outer periphery of this secondary protective layer 4, and is characterized in that glass transition temperature of the primary protective layer 3 is made to be higher than −20° C. and 10° C. or lower, glass transition temperature of the secondary protective layer 4 is made to be −10° C. or lower, and the glass transition temperature of the primary protective layer 3 is made higher than that of the secondary protective layer 4.

By the way, both of the primary protective layer 3 and secondary protective layer 4 are soft coating layers with a Young's modulus equal to or less than several MPa. However, since the primary protective layer 3 is a little harder than the secondary protective layer 4 under normal operating environmental temperature because Tg of the primary protective layer 3 is higher than Tg of the secondary protective layer 4, and it is further hard for a bubble to arise in the primary protective layer 3, in consequence, the delamination in an interface with the glass optical fiber becomes hardly to arise.

In addition, the third protective layer 5 has a Young's modulus of hundreds MPa or more to be hard, and bears a role of protecting the inside glass optical fiber from pressure from the external.

Ultraviolet curing resin composition is mainly used for these respective protective layers 3 to 5. In view of a cure rate and characteristics, a resin whose main component is an oligomer of a polyurethane acrylate system or an epoxy acrylate system is optimal. However, in the limitation of not spoiling effects of the present invention, other resin composites can be used without limiting the resin to the ultraviolet curing resin composition whose main component is an oligomer of the above-mentioned polyurethane acrylate system or epoxy acrylate system.

Furthermore, it is common to mix various additives, such as additives which control a cure rate, crosslinking density, and adhesiveness with a glass optical fiber, and an antioxidant with the above-mentioned ultraviolet curing resin composition whose main component is an oligomer of the polyurethane acrylate system or epoxy acrylate system.

In the optical fiber with the structure illustrated in FIG. 1 mentioned above, optical fibers equivalent to examples of the present invention by changing Tg and thicknesses of the primary protective layer 3 and secondary protective layer 4, and optical fibers which were comparative example were prepared. These are illustrated in Table 1.

Here, since Tg of a high polymer is dependent on molecular structure and crosslinking density, changing Tg of an ultraviolet cure resin composite is achieved generally by changing a kind and a content of an diluent monomer to be added. That is, when adding a polymer with high Tg among polymers obtained by polymerizing monomers independently, Tg of the ultraviolet cure resin composite can be increased. Alternatively, adding a polyfunctional monomer, such as a bifunctional monomer instead of a monofunctional monomer can also make Tg high.

TABLE 1

| | Construction of optical fiber ||||||  Evaluation result 60° C. hot water immersion test after one month Observation of interface between glass and primary protective layer | 60° C. hot water immersion test after one month ||  | Heat cycle | |
|---|---|---|---|---|---|---|---|---|---|---|---|
| | Primary protective layer || Secondary protective layer || Third protective layer || | Observation of bubble in primary protective layer | Observation of bubble in secondary protective layer | Presence of added loss | Presence of added loss | Determination |
| | Tg (° C.) | Thickness (μm) | Tg (° C.) | Thickness (μm) | Tg (° C.) | Thickness (μm) | | | | | | |
| Comparative example 1 | 0 | 10 | 0 | 20 | 90 | 35 | No delamination | No bubble | No bubble | ○ | Δ | X |
| Comparative example 2 | −10 | 10 | −10 | 20 | 90 | 35 | Occurrence of delamination | Presence of minute bubble | Presence of minute bubble | Δ | ○ | X |
| Comparative example 3 | −20 | 10 | −20 | 20 | 90 | 35 | Occurrence of delamination | | | | | |
| Example 1 | 0 | 10 | −10 | 20 | 90 | 35 | No delamination | | | | | |
| Example 2 | 5 | 10 | −10 | 20 | 90 | 35 | No delamination | | | | | |
| Example 3 | −5 | 5 | −40 | 25 | 90 | 35 | No delamination | | | | | |
| Example 4 | −5 | 10 | −40 | 20 | 90 | 35 | No delamination | | | | | |
| Example 5 | −5 | 15 | −40 | 15 | 90 | 35 | No delamination | | | | | |
| Example 6 | −5 | 20 | −40 | 10 | 90 | 35 | No delamination | | | | | |
| Comparative example 4 | 10 | 20 | −5 | 10 | 90 | 35 | No delamination | | | | | |
| Comparative example 5 | 10 | 5 | 0 | 25 | 90 | 35 | No delamination | | | | | |
| Comparative example 6 | 5 | 5 | 0 | 25 | 90 | 35 | No delamination | | | | | |
| Example 8 | 0 | 5 | −20 | 25 | 90 | 35 | No delamination | | | | | |
| Example 9 | 0 | 5 | −40 | 25 | 90 | 35 | No delamination | | | | | |
| Comparative example 7 | 0 | 5 | 5 | 25 | 90 | 35 | No delamination | | | | | |
| Comparative example 8 | −20 | 5 | −40 | 25 | 90 | 35 | Occurrence of delamination | | | | | |

TABLE 1-continued

| | | | | | |
|---|---|---|---|---|---|
| Comparative example 3 | Presence of bubble | Presence of bubble | X | ○ | X |
| Example 1 | No bubble | Presence of minute bubble | ○ | ○ | ○ |
| Example 2 | No bubble | Presence of minute bubble | ○ | ○ | ○ |
| Example 3 | No bubble | Presence of bubble | ○ | ○ | ○ |
| Example 4 | No bubble | Presence of bubble | ○ | ○ | ○ |
| Example 5 | No bubble | Presence of bubble | ○ | ○ | ○ |
| Example 6 | No bubble | Presence of bubble | ○ | ○ | ○ |
| Comparative example 4 | No bubble | No bubble | ○ | Δ | X |
| Comparative example 5 | No bubble | No bubble | ○ | X | X |
| Comparative example 6 | No bubble | No bubble | ○ | Δ | X |
| Example 8 | No bubble | Presence of minute bubble | ○ | ○ | ○ |
| Example 9 | No bubble | Presence of bubble | ○ | ○ | ○ |
| Comparative example 7 | No bubble | No bubble | ○ | X | X |
| Comparative example 8 | Presence of bubble | Presence of bubble | X | ○ | X |

As listed in Table 1, as for the third protective layer 5, its Tg was made to be 90° C. and its thickness was made constant at 30 μm. In view of mechanical strength needed for an optical fiber, it is suitable that Tg of the third protective layer 5 is 50° C. to 100° C. and thickness is 20 to 40 μm.

Figure 2:
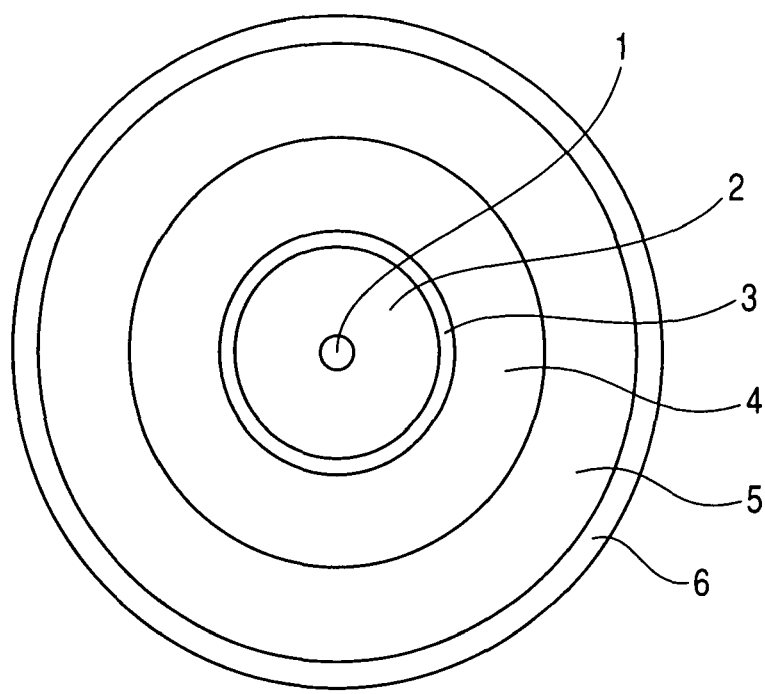
FIG. 2 is a cross-sectional schematic diagram showing one example of an optical fiber in which a coloring layer is applied to an outer periphery of an optical fiber of the present invention.
Figure 3:
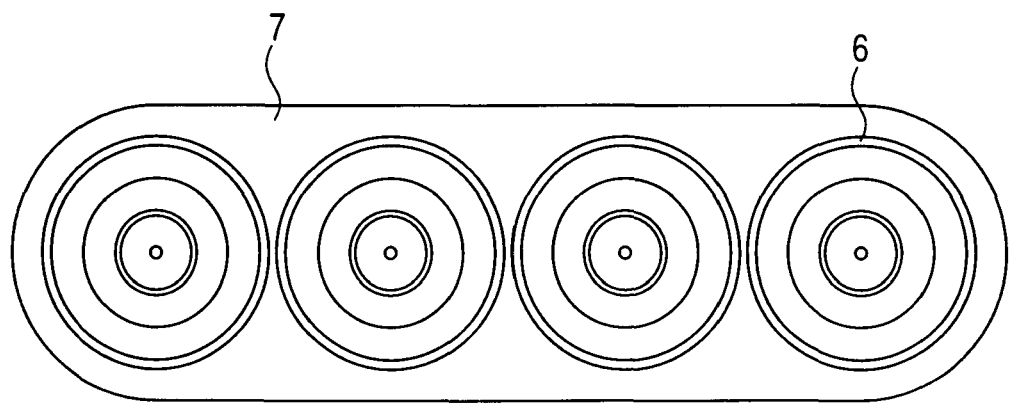
FIG. 3 is a cross-sectional schematic diagram showing one example of a ribbon using the optical fiber illustrated in FIG. 2.
Figure 4:
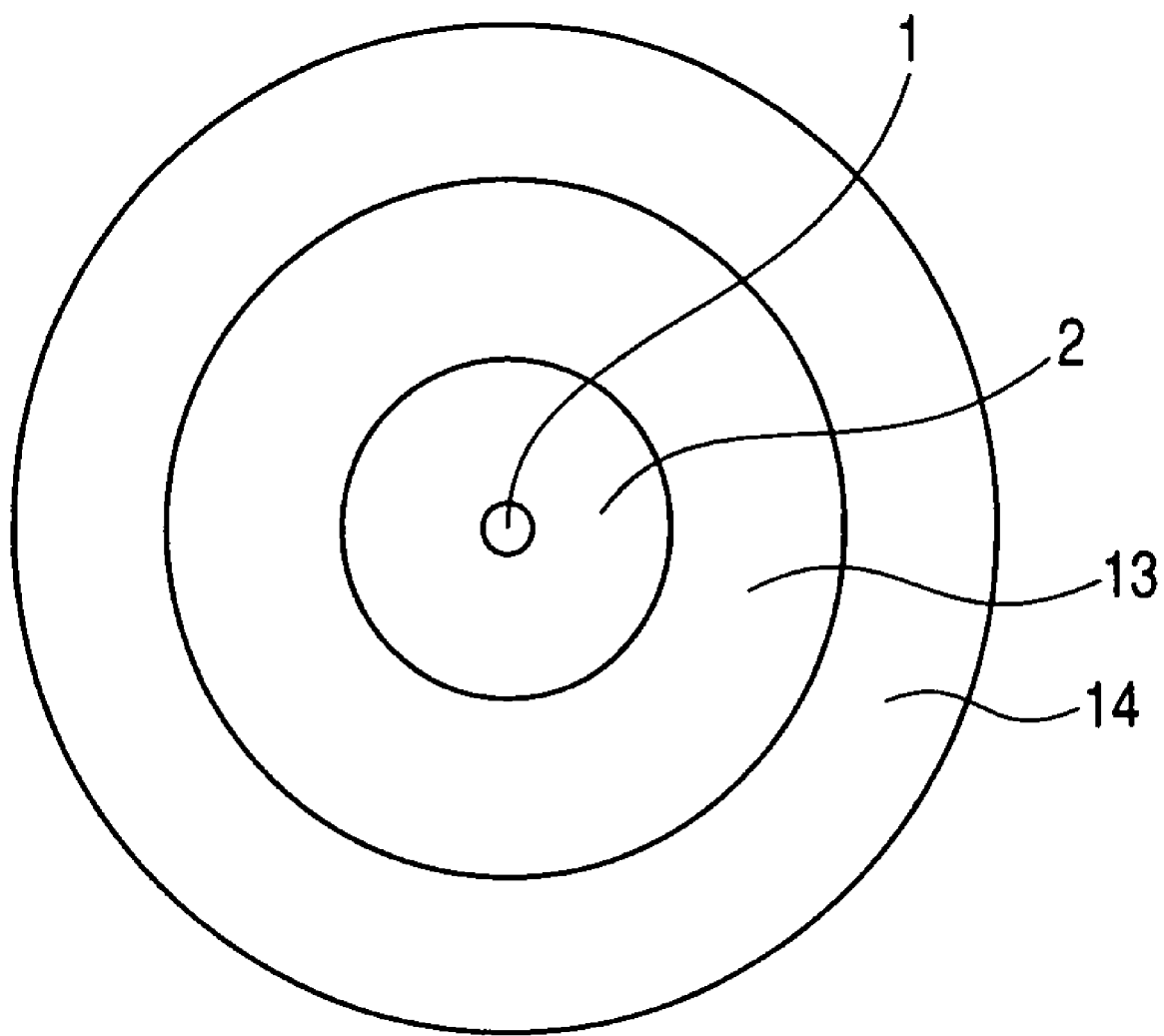
FIG. 4 is a cross-sectional schematic diagram showing an example of a conventional optical fiber.

Four-optical fiber ribbons which were usually used were obtained by providing a coloring layer with a thickness of about 5 μm which includes ultraviolet curing resin compositions further on the third protective layer 5, and specifically, a red coloring layer 6 on each of these optical fibers, which were prepared, as illustrated in FIG. 2 to make it an optical fiber, further arranging these four optical fibers in parallel planarly as illustrated in FIG. 3, and applying a ribbon layer 7 to this for ribbon using commercial ultraviolet curing resin compositions.

By the way, although a colorant made from a red ultraviolet curing resin composition which is commercial and is used for an optical fiber is used as a colorant, color may not be limited to red but may be any color. In addition, a thickness of the coloring layer is generally 4 μm to 8 μm.

Various evaluations were performed using these ribbons. As an evaluation of transmission characteristics, increase of transmission loss, and added loss in a heat cycle after the ribbons were immersed in 60° C. hot water for one month were measured using a wavelength of 1550 nm.

When a heat cycle test is specifically expressed, its procedure comprises the steps of holding a ribbon at 23° C. for 1 hour, dropping temperature to −40° C. at rate of 40° C./hour and holding the ribbon at this temperature for 1 hour, dropping temperature to −60° C. at rate of 40° C./hour after that, and holding the ribbon at this temperature for 1 hour, subsequently, raising temperature to 23° C. at rate of 40° C./hour and holding the ribbon at this temperature for 1 hour, raising temperature up to 80° C. at rate of 40° C./hour and holding the ribbon at this temperature for 1 hour, dropping temperature to 23° C. at rate of 40° C./hour, repeating this heat cycle pattern 4 times, and measuring a fluctuation amount of transmission loss. Then, the obtained fluctuation amount of the transmission loss was made as increase of the transmission loss at the time of the heat cycle.

As evaluation criterion, in measurement of the added loss after a ribbon was immersed in 60° C. hot water for one month, it was determined to be ○ (no increase of transmission loss) when the added loss to the transmission loss before being immersed in the hot water was 0.05 dB/km or less, to be Δ (a little increase of transmission loss) when the added loss was 0.05 to 0.2 dB/km, and to be × (increase of transmission loss) when the increase was 0.2 dB/km or more.

In addition, as for the added loss at the time of the heat cycle, it is defined to be ○ (no increase of transmission loss) in the case of 0.03 dB/km or less, to be Δ (a little added loss) in the case of 0.03 to 0.05 dB/km, and to be × (increase of transmission loss) in the case of 0.05 dB/km or more.

Then, in the evaluation result of the added loss after 60° C. hot water immersion for one month and the added loss in the heat cycle, when the number of × or Δ was even one, it was determined that the optical fiber could not be used. The above result was also listed in Table 1.

By the way, changes of physical quantities, such as specific heat capacity, a coefficient of thermal expansion, and a mechanical modulus of elasticity, are observed with bordering on glass transition temperature. Hence, Tg can be measured using various kinds of analyzers, such as a differential scanning calorimeter (DSC), a thermomechanical analyzer (TMA), and a dynamic mechanical analyzer (DMA).

Nevertheless, since a value of Tg obtained by a kind of a measuring method also changes, Tg was measured in the present invention using the dynamic mechanical analyzer (DMA) in every case. This method is a method of performing measurement using a fact that a molecular motion increases remarkably and a modulus of elasticity changes a lot in a glass transition region. That is, since a Young's modulus of a resin changes a lot from about 1000 MPa to about 1 MPa, that is, by three digits by a state transferring to a rubbery state from a glassy state, the measurement is performed using glass transition becoming measurable in high sensitivity.

By the way, the dynamic mechanical analysis analyzes viscoelasticity observed when distortion or stress which changes periodically is applied to an object. By performing the dynamic mechanical analysis, data of a storage elastic modulus (G'), a loss elastic modulus (G"), and a loss tangent value (tan δ=G"/G') can be obtained.

Here, the storage elastic modulus expresses an elastic component of a substance and the loss elastic modulus expresses a viscosity component of the substance, and the loss tangent value is a value obtained by dividing the loss elastic modulus by the storage elastic modulus, and expresses a balance between the elastic component and viscosity component. In the case of a perfect elastic material, a stress and distortion are proportional, and the distortion is detected without delaying (phase difference zero) from the given stress. On the other hand, in the case of a perfect viscous material, since a strain rate is proportional to a stress, when the stress is given in sin (ωt), distortion of a response becomes −cos(ωt)=sin(ωt−π/2). The distortion is detected with delaying from the stress by ¼ wavelength (phase difference of π/2).

As for the measurement, a displacement amount of a sample is detected when an alternating current force is applied to the sample, and Fourier data processing is performed from the alternating current force applied to the sample, and the detected displacement amount to find the phase difference.

Since a general high polymer has intermediate property between the perfect elastic body and viscous body, phase difference becomes between 0 to π/2. This analysis measures relationship between the stress and distortion and outputs the loss tangent value which expresses a ratio of the storage elastic modulus of the elasticity component, which is a mechanical characteristic, to the loss elastic modulus of the viscosity component. Then, in the present invention, temperature at which this loss tangent value shows a maximal value is defined as glass transition temperature, that is, Tg.

Here, the loss tangent value was measured under the following dynamic viscoelasticity test conditions using DMS6100 (registered trademark) made by Seiko Instruments Inc. as a dynamic viscoelasticity apparatus by cutting a strip-like sample from a sheet made by curing the ultraviolet curing resin under the following ultraviolet curing sheet producing conditions, and fixing this to a tension type jig. Temperature at which a maximal value appeared was defined as Tg in this measurement.

Production conditions of ultraviolet curing sheet:
Thickness: 100 μm
Illuminance: 1000 mW/cm$^2$
Exposure dose: 500 mJ/cm$^2$
Dynamic viscoelasticity test conditions
Vibration frequency of the alternating current force: 1 Hz
Temperature increasing rate of sample: 2° C./min As is evident from Table 1, an optical fiber that glass transition temperature of the primary protective layer 3 was made to be higher than −20° C. and 10° C. or lower, glass transition temperature of the secondary protective layer 4 was made to be −10° C. or lower, and the glass transition temperature of the primary protective layer was made higher than that of the secondary protective layer had no problem also in the evaluation result of the increase of the transmission loss after 60° C. hot water immersion for one month, and the added loss in the heat cycle. Hence, the optical fiber was determined to be ○.

Furthermore, as is evident from the example 6 and the comparative example 4, when a thickness of the primary protective layer 3 is thicker than a thickness of the secondary protective layer 4, and in particular, the thickness is thicker than 10 μm, a range of permissible Tg becomes narrow, and when Tg of the primary protective layer 3 and the secondary protective layer 4 is high, the increase of the transmission loss arises in the heat cycle.

Hence, it is suitable that the thickness of the primary protective layer 3 is equal to or less than the thickness of the secondary protective layer 4, and in particular, the thickness is 10 μm or less, and in this case, it can be performed to minimize an adverse effect on the micro bending resistance characteristic by making Tg of the primary protective layer 3 higher than that of the secondary protective layer 4 in order to enhance the adhesiveness to the glass optical fiber.

In addition, (No delamination) in Table 1 means that no part which was delaminated could be seen by observing with an optical microscope an interface between the glass of the optical fiber and the primary protective layer 3 after immersion in 60° C. hot water for one month.

In FIGS. 1 to 3 mentioned above, although the optical fiber of the present invention, the optical fiber in which the coloring layer is applied to this, and the ribbon using these optical fiber are illustrated, the optical fiber of the present invention can be made into an optical cord or an optical cable with collecting a plurality of those made into an optical fiber in which, for example, a coloring layer is applied. It is also satisfactory to collect a plurality of ribbons to make it into an optical cable. It is needless to say that the optical fiber of the present invention can be used for various types of general-purpose optical fiber, ribbon, optical cord, and optical cable.

As mentioned above, the optical fiber of the present invention can provide an optical fiber in which composites constructing its coating are not complicated, so, there is also little constraint in view of production, and, moreover, delamination between a glass optical fiber and a primary layer, and a bubble in the primary layer hardly arise.

What is claimed is:

1. An optical fiber comprising:
   a glass optical fiber including a core and a cladding;
   a buffer layer covering the glass optical fiber; and
   a hard layer covering the buffer layer, the hard layer being harder than the buffer layer, wherein
   the buffer layer includes:
      a primary protective layer in contact with the glass optical fiber and made to coat the glass optical fiber, wherein a thickness of the primary protective layer is 10 μm or less; and
      a secondary protective layer applied on the primary protective layer, the hard layer is a third protective layer applied to an outer periphery of the secondary protective layer,
   a Young's modulus of each of the primary and secondary protective layers is equal to or less than several MPa and a Young's modulus of the third protective layer is hundreds MPa or more,
   a glass transition temperature of the primary protective layer is made to be higher than −20° C. and 10° C. or lower,
   a glass transition temperature of the secondary protective layer is made to be −10° C. or lower, and
   the glass transition temperature of the primary protective layer is made higher than the glass transition temperature of the secondary protective layer.

2. The optical fiber according to claim 1, wherein the thickness of the primary protective layer is equal to or less than a thickness of the secondary protective layer.

* * * * *